F. L. SCHANTZ.
FOCUSING ATTACHMENT FOR CAMERAS.
APPLICATION FILED MAR. 17, 1916.
1,201,508.
Patented Oct. 17, 1916.
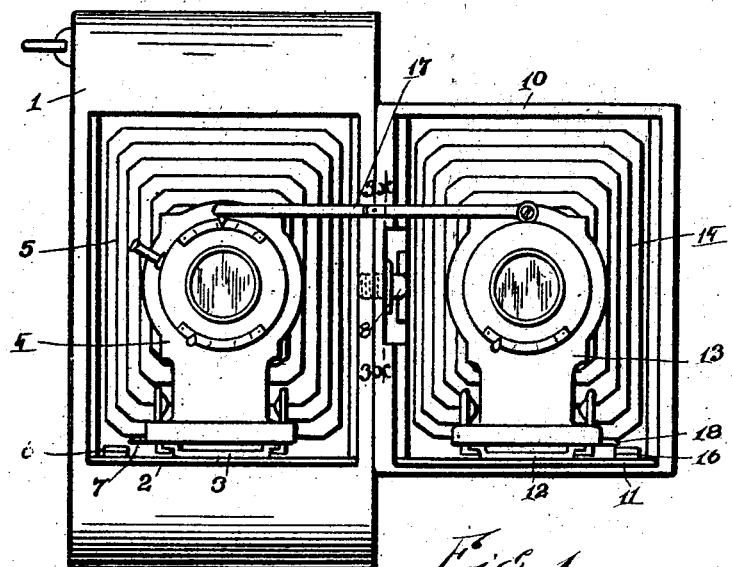
Fig. 1.
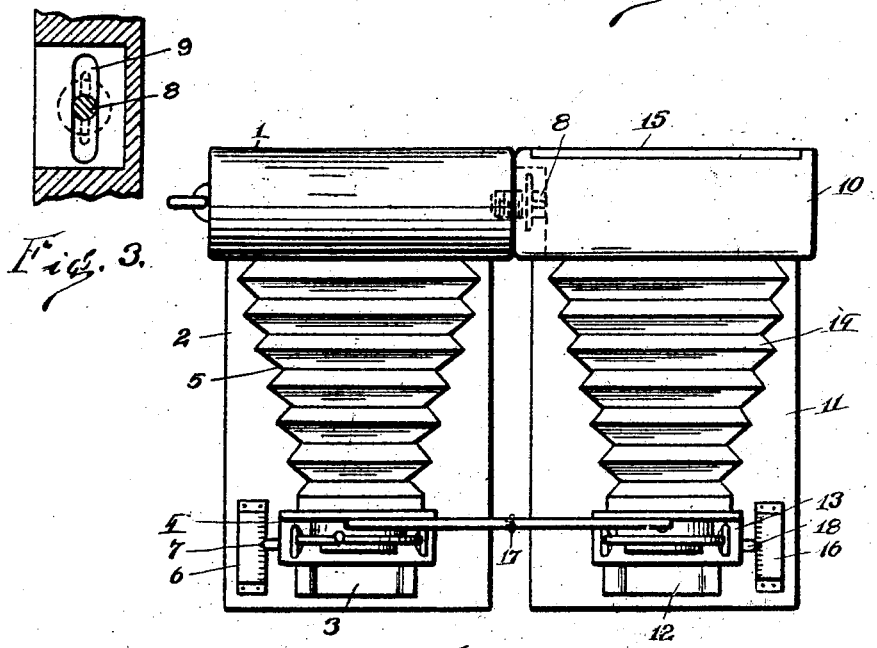
Fig. 3.
Fig. 2.
Witnesses
Eric Ischinger
Edna K. Booth
Inventor
Frank L. Schantz
By Frank Keiper
Attorney

UNITED STATES PATENT OFFICE.

FRANK L. SCHANTZ, OF ROCHESTER, NEW YORK.

FOCUSING ATTACHMENT FOR CAMERAS.

1,201,508.   Specification of Letters Patent.   Patented Oct. 17, 1916.

Application filed March 17, 1916. Serial No. 84,963.

*To all whom it may concern:*

Be it known that I, FRANK L. SCHANTZ, a citizen of the United States, residing at Rochester, in the county of Monroe and State of New York, have invented certain new and useful Improvements in Focusing Attachments for Cameras, of which the following is a specification.

The object of this invention is to provide a camera with a new and improved form of focusing attachment with which the camera can be very accurately focused and adjusted.

Another object of this invention is to provide a camera with an attachment through which the object of which a picture is to be taken can be watched while the exposure is being made.

Another object of this invention is to provide a camera with a focusing attachment which shows the object of which a picture is to be made in exactly the same size and position as it will be projected on the sensitized film of a camera when an exposure is being made.

Another object of this invention is to provide a focusing device which can be readily attached and detached from the side of any folding camera.

These and other objects of my invention will be fully illustrated in the drawings, described in the specification and pointed out in the claims at the end thereof.

In the accompanying drawings, Figure 1 is a front elevation of the camera with the focusing device attached thereto. Fig. 2 is a top plan view of the camera and focusing device. Fig. 3 is a section taken on the line 3ˣ—3ˣ of Fig. 1.

In the drawings like reference numerals indicate like parts.

The camera shown in the drawings, may be one of any of the well known types on the market which consist chiefly of a body 1 having a bed plate 2 hinged at the front thereof. To this bed plate is fastened a guide or runway 3 on which is mounted to slide the frame 4 which carries the casing for the lens, shutter and diaphragm. Suspended between the frame 4 and the body 1 of the camera are the bellows 5, in back of which is placed the sensitized film or plate. A scale 6 is provided on the bed plate 2 over which the pointer 7, which is fastened to the frame 4, is moved to indicate approximately the distance to which the lens of the camera is focused.

So far I have described the main features of any of the well known types of cameras to show that the focusing device which I am now about to describe can be attached to any of the cameras now on the market.

The focusing device is adapted to be clamped to the side of the camera body 1 by means of a thumb screw 8 which passes through the slot 9 provided in the side of the focusing device and into the threaded opening provided in the camera for the use of a tripod, as shown in Fig. 3. The focusing camera consists of a body 10, to the front of which is hinged the bed plate 11, to which in turn is fastened the guide or runway 12 on which is mounted to slide the frame 13. This frame carries the casing for a lens and diaphragm, the shutter being omitted therefrom. The bellows 14 are suspended between the frame 13 and the body 10 in the ordinary manner. The back of the focusing camera is provided with a focusing glass or screen 15 onto which the picture which is to be focused is projected.

As will be seen from an inspection of Figs. 1 and 2, the focusing camera is practically a duplicate of the camera proper except that the body of the focusing camera is not constructed to receive a sensitized film or plate in place of which, however, the focusing glass or screen is inserted. The guide 3, frame 4 and bellows 5 are identical in size to the guide 12, frame 13 and bellows 14 and even the scale 16 provided on the bed plate 11 corresponds to the scale 6 mounted on the bed plate 2 of the camera. The frame 13 carries a casing in which is mounted a lens having exactly the same focal length as the lens carried on the frame 4 of the camera. The casing on the frame 13 is also provided with a diaphragm identical to the one used in the camera. There is no need for a shutter in the focusing camera and it is therefore omitted therefrom.

An adjusting arm 17 is pivotally mounted to the frame 13 of the focusing camera which is used for a purpose that will presently appear.

In operation the frame 13 and bellows 14 of the focusing camera are pulled out to the point where the lens carried on the frame 13 projects the object of which an exposure is to be made on the screen 15 in such a manner that every line thereof is perfectly clear and sharp. The operator then notes the position of the lens front of the focusing camera either by its general position of the lens front of the focusing camera or by the pointer 18 on the scale 16 and lines up the lens front of the camera accordingly. To facilitate the lining up of the camera parts to correspond to those of the focusing camera the arm 17 may be swung out into the path of the frame 4 of the camera so that when the lens front of the camera is pulled out until it strikes the arms 17, as shown in Figs. 1 and 2, the camera is lined up to correspond with the focusing camera and the image on the screen 15 shows exactly a duplicate of the one which is about to be projected onto the sensitized film or plate of the camera as soon as an exposure is made. The device also permits the operator to watch through the focusing camera the object of which he intends to make a picture before, during and after the exposure with the same accuracy as if he were looking through the camera itself.

It will be understood that the body of the focusing camera can be made thinner than the body of the camera to which it is attached, so that it can be easily carried in a pocket when it is detached from the camera.

As shown in Figs. 1 and 2 the arm 17 is hinged near the middle thereof so that it can be folded when not in use.

As nearly all the lens fronts of the cameras have a sliding front which permits an adjustment thereof sidewise, the lens front of the focusing camera may also be made to move sidewise to give it the same range of adjustment as the lens front of the camera.

I claim:

1. The combination of a camera having a focusing device attached thereto, said focusing device consisting of a lens front, a lens carried thereby and a guide therefor, a focusing glass or screen at the back of said focusing device, said lens front being adapted to be adjusted independently of said camera, an arm attached to said lens front to line up the camera to correspond with said focusing device.

2. The combination in a focusing camera, of a body, a bed plate hinged thereto, a lens front mounted to slide on said bed plate, a lens carried by said lens front, a focusing screen mounted on the back of said body and a clamping screw in the side of said focusing device to clamp said body to a camera to line up the focal planes, a folding arm pivoted on said lens front, said folding arm being adapted to swing into the path of the lens front of the camera to which said focusing device is attached.

3. The combination in a focusing camera, of a body, a bed plate hinged thereto, a lens front mounted to slide on said bed plate, a lens carried by said lens front, an arm attached to said lens front to project into the path of the lens front of the camera to be focused and lined up therewith, a focusing screen mounted on the back of said body and means to clamp said body to a camera and line it up with the focal plane thereof.

4. The combination in a folding focusing camera of a frame or body, a bed plate hinged to said body, a lens front mounted to slide on said bed plate, a lens carried by said lens front, a bellows interposed between said lens front and said body, a focusing screen at the back of said body, an elongated opening in the side of said body, an adjusting screw passing through said elongated opening, said adjusting screw being adapted to clamp said focusing camera to the body of a film camera and hold said focusing camera in proper alinement with the film camera, a gage on said focusing device, said gage forming a stop against which the lens front of the film camera is moved and adjusted with relation to said focusing camera.

5. A double camera comprising a photographing camera on one side and an observing camera on the other side, said cameras having duplicate lenses, each of said cameras having an adjustable lens front, the lens front of the observing camera being adjustable to focus independently of the lens front of the photographic camera, a gage on the lens front of the observing camera projecting into the path of the lens front of the other camera to indicate the corresponding focal position of the other lens front.

6. A double camera comprising a photographing camera on one side and an observing camera on the other side, said cameras having duplicate lenses, each of said cameras having an adjustable lens front, the lens front of the observing camera being adjustable to focus independently of the lens front of the photographing camera, the lens front of the observing camera indicating by its position the correct position of the lens front of the photographic camera for photographing the object in view.

7. A double camera comprising a photographing camera and an observing camera, each having a separate box placed side by side with the adjacent sides clamped together, said cameras having duplicate lenses, each of said cameras having an adjustable lens front, the lens front of the observing camera being adjustable to focus independently of the lens front of the photographing camera.

8. A film camera comprising a photographing camera and an observing camera, said photographing camera being adapted to receive a roll film, said film being adapted to pass over the focal plane of said photographing camera, said observing camera having a translucent focusing screen in its focal plane, said cameras having duplicate lenses, each of said cameras having an adjustable lens front, the lens front of the observing camera being adjustable to focus independently of the lens front of the photographing camera, a gage on the lens front of said observing camera to indicate the corresponding position for the lens front of said photographing camera.

In testimony whereof I affix my signature.

FRANK L. SCHANTZ.